US012749591B2

(12) United States Patent
Aoyama et al.

(10) Patent No.: US 12,749,591 B2
(45) Date of Patent: Sep. 29, 2026

(54) TUNGSTEN WIRE, AND TUNGSTEN WIRE PROCESSING METHOD AND ELECTROLYTIC WIRE USING THE SAME

(71) Applicant: Niterra Materials Co., Ltd., Yokohama (JP)

(72) Inventors: Hitoshi Aoyama, Yokohama (JP); Hideaki Baba, Yokohama (JP); Kenji Tomokiyo, Yokohama (JP)

(73) Assignee: Niterra Materials Co., Ltd., Yokohama (JP)

( * ) Notice: Subject to any disclaimer, the term of this patent is extended or adjusted under 35 U.S.C. 154(b) by 197 days.

(21) Appl. No.: 18/422,065

(22) Filed: Jan. 25, 2024

(65) Prior Publication Data

US 2024/0170177 A1 May 23, 2024

Related U.S. Application Data

(63) Continuation of application No. PCT/JP2022/028786, filed on Jul. 26, 2022.

(30) Foreign Application Priority Data

Jul. 28, 2021 (JP) ................................ 2021-123037

(51) Int. Cl.
*B32B 5/14* (2006.01)
*C22C 38/04* (2006.01)
(Continued)

(52) U.S. Cl.
CPC .......... *H01B 1/02* (2013.01); *H01B 13/0006* (2013.01)

(58) Field of Classification Search
None
See application file for complete search history.

(56) References Cited

U.S. PATENT DOCUMENTS 5,972,069 A 10/1999 Maekawa et al.
2003/0132707 A1 7/2003 Meszaros et al.
(Continued)

FOREIGN PATENT DOCUMENTS

CN 1606631 A 4/2005
CN 113174521 A 7/2021
(Continued)

OTHER PUBLICATIONS

Aoyama et al., machine translation of WO 2022230455, Nov. 3, 2022 (Year: 2022).*

(Continued)

*Primary Examiner* — Mary I Omori
(74) *Attorney, Agent, or Firm* — Oblon, McClelland, Maier & Neustadt, L.L.P.

(57) ABSTRACT

According to one embodiment, a tungsten wire includes a tungsten alloy containing rhenium. According to an EBSD analysis on a unit area, crystalline orientations having an orientation difference of 15 degrees or less from <101>, which is parallel to a wire drawing direction, account for an area ratio of 70% or more and 90% or less to a measurement field on an IPF map. The unit area is a 40 μm×40 μm area located within a range of 100 μm concentrically extending from a central axis in a cross-section along a wire radial direction, which is perpendicular to the wire drawing direction.

13 Claims, 3 Drawing Sheets

(51) Int. Cl.
*H01B 1/02* (2006.01)
*H01B 13/00* (2006.01)

(56) References Cited

U.S. PATENT DOCUMENTS

| | | | |
|---|---|---|---|
| 2004/0244879 | A1 | 12/2004 | Tanaka et al. |
| 2010/0084055 | A1 | 4/2010 | Tanaka et al. |
| 2011/0319931 | A1 | 12/2011 | Esaki |
| 2012/0285586 | A1 | 11/2012 | Tanaka et al. |
| 2022/0098708 | A1 | 3/2022 | Kanazawa et al. |

FOREIGN PATENT DOCUMENTS

| | | | | |
|---|---|---|---|---|
| JP | 59-59867 | A | 4/1984 | |
| JP | 2637255 | B2 | 8/1997 | |
| JP | 3320650 | B2 | 9/2002 | |
| JP | 3803675 | B2 | 8/2006 | |
| JP | 4256126 | B2 | 4/2009 | |
| JP | 4426904 | B2 | 3/2010 | |
| JP | 5578852 | B2 | 8/2014 | |
| WO | WO 03/031668 | A1 | 4/2003 | |
| WO | WO 2020/105644 | A1 | 5/2020 | |
| WO | WO 2020/137255 | A1 | 7/2020 | |
| WO | WO-2020196192 | A1 * | 10/2020 | ............ H01J 61/073 |
| WO | WO-2022230455 | A1 * | 11/2022 | ............ C22C 27/04 |

OTHER PUBLICATIONS

Mizobe et al., machine translation of WO 2021/196192, Oct. 1, 2020 (Year: 2020).*
International Search Report issued Oct. 11, 2022 in PCT/JP2022/028786 filed on Jul. 26, 2022, 2 pages.
Extended European Search Report Issued May 23, 2025 in European Patent Application No. 22849491.0, 10 pages.
Office Action mailed May 29, 2026, in Chinese Application No. 202280052297.9 filed Jul. 26, 2022 (w/machine-generated English translation).

* cited by examiner

Crystalline orientation

Atomic arrangement in bcc

TUNGSTEN WIRE, AND TUNGSTEN WIRE PROCESSING METHOD AND ELECTROLYTIC WIRE USING THE SAME

CROSS-REFERENCE TO RELATED APPLICATION

This application is a Continuation application of PCT Application No. PCT/JP2022/028786, filed Jul. 26, 2022 and based upon and claiming the benefit of priority from Japanese Patent Application No. 2021-123037, filed Jul. 28, 2021, the entire contents of all of which are incorporated herein by reference.

FIELD

Embodiments described below relate to a tungsten wire, and a tungsten wire processing method and an electrolytic wire using the tungsten wire.

BACKGROUND

Materials adopted for the needles (probe pins) of a probe card, which is used for testing electrical characteristics of wafers, etc. of a semiconductor integrated circuit (LSI), include tungsten (W), a rhenium-tungsten (ReW) alloy, a palladium alloy, beryllium copper, and so on, and these materials are selected and used according to types of electrode pads. There are mainly two types of electrode pads, namely, an aluminum pad and a gold pad. For aluminum pads, W or ReW probe pins having a high hardness and superior electric resistance and wear resistance are usually used in view of the need to penetrate through the insulating covering formed by oxidation on the electrode pad surface.

With the development of integration-enhancing and miniaturization-pursuing technologies for semiconductors, narrower pitches and smaller diameters of the pins in a probe card are still being demanded, and at present, ReW pins of even a size of φ0.02 mm to 0.04 mm are in use. To cope with the testing of LSIs of a high degree of integration, a smaller diameter is adopted for probe pins so as to increase the number of pins arranged per unit area. To this end, a ReW wire having an extra small diameter needs to be manufactured.

For such a ReW wire having a small diameter (thin wire), a sintered object is first subjected to a swaging and drawing (wire drawing) process (a first treatment) or the like to form a ReW wire having a diameter of 0.3 to 1.2 mm (a medium wire). In the description below, a wire having a diameter of 0.3 to 1.2 mm may also be called a “medium wire”. Then, a proper amount of the ReW medium wire is subjected to additional processes such as drawing and heating as needed, so that the ReW wire has a prescribed wire diameter. In the course of this thinning process, a crack or a breakage caused from the crack could easily occur during the wire drawing. Such a breakage occurring during the wire drawing for a thin wire significantly lowers the yield, particularly in instances where a multi-stage wire drawing machine which employs multiple dies for processing is used. Furthermore, repair and restart, which are required after the breakage of the wire, increase the number of processing steps.

Conventionally, measures against wire breakage included a method in which the management of a lubricant and the conditions for wire drawing are strictly controlled. For example, according to a method for tungsten wires (cf. Patent Document 1: Japanese Patent No. 5,578,852), a lubricant to be applied to the surface of a tungsten wire contains a graphite (C) powder and a thickening agent and has a specific weight of 1.0 to 1.1 g/cm$^3$, and change in the specific weight during the processing steps is kept in an amount equal to or less than 0.05 g/cm$^3$. The wire drawing process uses a tungsten wire temperature of 500° C. or higher and 1300° C. or lower, a drawing die temperature of 300° C. or higher and 650° C. or lower, a drawing rate of 10 m/min or faster and 70 m/min or slower, and an area reduction ratio of 5% or more and 15% or less for the final drawing step. Also, a method was available in which the number of recrystallizations is controlled by utilizing a heat treatment during the intermediate step, so as to improve processability. For example, according to a method for ReW wires (cf. Patent Document 2: Japanese Patent No. 2,637,255), a final recrystallization treatment is conducted in response to a ratio of reduction of the cross-sectional area (an area reduction ratio) of a molded object with respect to the sintered object reaching a ratio of 90% or less beyond 75%, so that the number of recrystallized grains in the central portion and the surface portion of the molded object is adjusted to 500 to 800 grains/mm$^2$. Patent Document 1 (Japanese Patent No. 5,578,852) discloses a method for suppressing variations in processability by regulating the processing conditions for the wire drawing step. Patent document 2 (Japanese Patent No. 2,637,255) discloses a method for using a predetermined area reduction ratio up to a recrystallization treatment from a sintered object and controlling the number of crystals by a heat treatment, and this effect is related to processing up to a finished diameter of as much as 1.0 mm.

DETAILED DESCRIPTION

Problems to be solved by the present invention include providing a tungsten wire, and a tungsten wire processing method and an electrolytic wire using the tungsten wire, which can improve the situations of crack occurrence during the thinning process by controlling crystal orientations in a medium wire.

In order to solve the problems, an embodiment provides a tungsten wire constituted by a rhenium (Re)-containing tungsten alloy wherein, according to an EBSD analysis on a unit area, crystalline orientations having an orientation difference of 15 degrees or less from <101>, which is parallel to a wire drawing direction, account for an area ratio of 70% or more and 90% or less to a measurement field on an inverse pole figure (IPF) map. Here, the unit area is a 40 μm×40 μm area located within a range of 100 μm concentrically extending from a central axis in a cross-section along a wire radial direction, which is perpendicular to the wire drawing direction.

A tungsten wire according to one or more embodiments will be described with reference to the figures. In the description below, a tungsten wire may also be called a "ReW wire". The figures are schematic and not intended to limit each component to, for example, a dimensional ratio, etc., illustrated in the figures.

Figure 1:
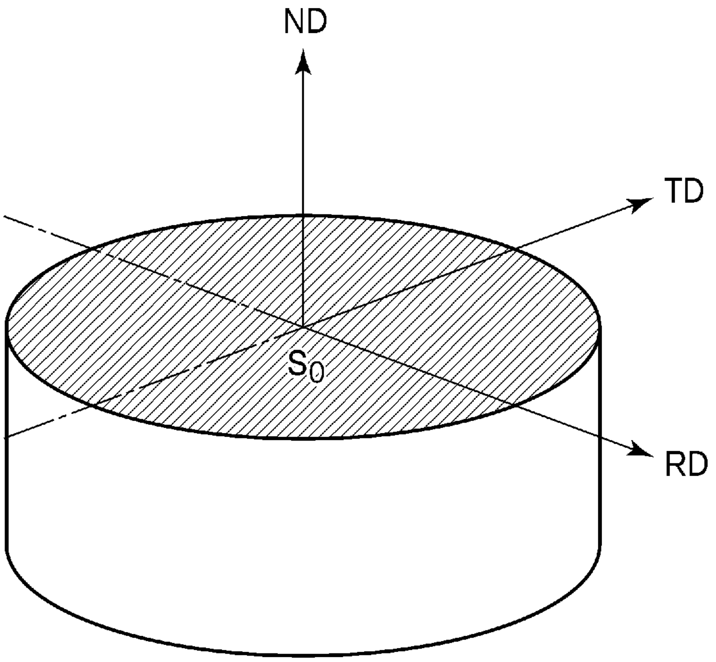
FIG. 1 shows an example of a sample taken from a ReW wire according to an embodiment.

FIG. 1 shows an example of a sample taken from a ReW wire according to an embodiment. Any sampling positions may be adopted, but in order to arrange for a flow of subsequent steps with good yields and to check variations in the entire wire, it is preferred that the sampling be conducted at positions in each ReW wire where its respective head and tail ends are cut off and n samples be taken from each position (n being 1 or greater). The head and tail ends include portions that make the conditions unstable at the starting and stopping of a wire drawing device, and therefore, these end portions are not sampled. The portions involving instability vary their lengths depending on the layout and size of the device. Preferably, the sample taken from the ReW wire has a length (e.g., 100 to 150 mm) which enables multiple observations of the cross-section using a resin filling technique. A ReW wire that has undergone the wire drawing process has a mixture layer on its surface. The mixture layer contains W, C, and O as constituting elements. A main body part which remains after removal of this mixture layer is used as a sample. The sample is subjected to resin filling and polishing so that the cross-section (S0) perpendicular to the axial direction (ND) serves as a measurement surface. Etching is conducted as needed. The measurement surface has a surface roughness of Ra 0.08 to 0.12 μm, measured with a laser microscope at a magnification of 50.

The measurement surface S0 as shown in FIG. 1 is subjected to crystalline orientation analysis through an electron backscattered diffraction (EBSD) method. In EBSD, a crystal specimen is irradiated with an electron beam. The electrons are diffracted and emitted as reflected electrons from the specimen. The diffraction pattern is projected, and the crystalline orientation can be measured from the projected pattern. X-ray diffraction (XRD) is a method for measuring an average value of the crystalline orientations of multiple crystals. EBSD, in contrast, allows for the acquisition of information on each crystal grain, and thus the measurement of its crystal orientation. The orientation distribution of crystal grains can then be analyzed from the crystalline orientation data. The method may also be called an electron backscattered diffraction pattern (EBSP) method.

For EBSD analysis, for example, a thermal field emission scanning electron microscope (TFE-SEM) JSM-6500F manufactured by JEOL Ltd., and a DigiViewIV slow scan CCD camera, OIM Data Collection ver. 7.3 x, and OIM Analysis ver. 8.0 manufactured by TSL Solutions Co., Ltd., may be used.

As the measurement positions in the EBSD analysis, three locations within each of the range of 100 μm extending concentrically from the central axis of the sample (a central portion) and the range of 50 μm extending inwardly from the outer periphery of the sample (an outer peripheral portion) are observed at a magnification of 1000, with a region of 40 μm×40 μm set as a measurement target. The measured portions here may partially overlap each other. Measurement is conducted under the measurement conditions adopting an electron beam acceleration voltage of 15 kV, an irradiation current of 15 nA, a specimen inclination angle of 70 degrees, and an interval of 200 nm/step.

An inverse pole figure (IPF) map refers to a crystalline orientation map based on an inverse pole figure. It can indicate the distribution states of specified crystalline orientations, which face in the specified specimen directions (ND, TD, RD, etc.), and also orientation ranges. Also, the area ratio of the specified crystalline orientations and orientation ranges can be obtained from it through image analysis. An IPF map is created according to the EBSD measurement method discussed above.

For a crystal orientation, a fundamental vector is used to indicate the direction. A notation constituted by a combination of numeric characters sandwiched by brackets ([ ]) exclusively represents a specific crystalline orientation. A notation constituted by a combination of numeric characters sandwiched by angle brackets (< >) represents a specific crystalline orientation and also its equivalent direction. For example, <101> means that a direction equivalent to is included. Also, for example, <101> being indicated to be a dominant orientation means that the <101> orientations form the largest proportion among all the crystalline orientations.

Figure 2A:
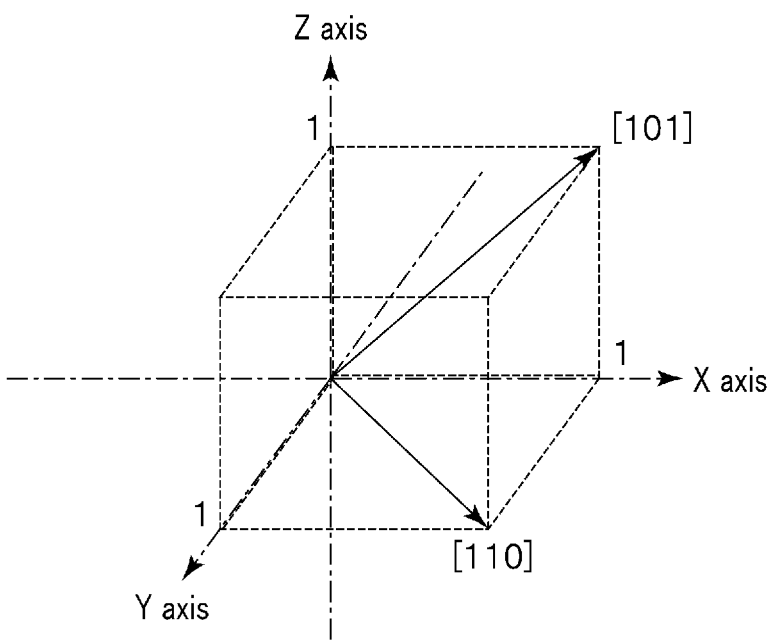
FIG. 2*a* gives a schematic illustration of crystalline orientations.
Figure 2B:
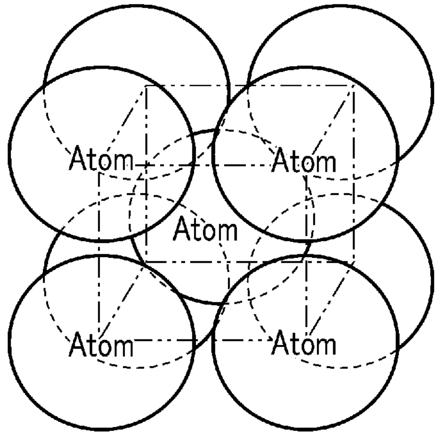
FIG. 2*b* gives a schematic illustration of a bcc structure.

Metal crystalline lattices each have a specific slip plane and slip direction. From a microscopic point of view, plastic deformation occurs due to slippage of a crystal lattice. Repeated deformation in the same direction as in a wire drawing process consequently gives convergence to a specific slip plane and slip direction. It is known that, under a wire drawing process, a metal having a body-centered cubic lattice (bcc) involves creation of a <110> orientation texture in parallel with the wire drawing direction (which forms the final stable orientation). FIG. 2*a* generally shows the and orientations, and FIG. 2*b* generally shows an atomic arrangement in bcc. As can be seen from the drawings, <101> and <110> in bcc are equivalent to each other.

In the central portion of the ReW wire according to an embodiment, an area ratio accounted for by crystalline orientations having an orientation difference of 15 degrees or less from <101>, which is parallel to ND, to the measurement field is preferably 70% or more and 90% or less, and more preferably 80% or more and 90% or less. Also, an area ratio accounted for by crystalline orientations having an orientation difference of 5 degrees or less from <101> to the measurement field is preferably 40% or more and 55% or less, and more preferably 45% or more and 55% or less. The ReW wire according to the embodiment is of bcc; as such, continuing with the wire drawing process advances the convergence to <101>, which is parallel to the ND direction. If the ratio of crystalline orientations having an orientation difference of 15 degrees or less from <101> is above 90%, or if the ratio of crystalline orientations having an orientation difference of 5 degrees or less from <101> is above 55%, a plastic deformation during the thinning process hardly occurs so that cracks would easily occur. In some instances, annealing for recrystallization at a large diameter stage of the thinning process could become mandatory. Recrystallization can degrade the processability of a ReW wire, while increasing the likelihood of crack occurrence. If the ratio of crystalline orientations having an orientation difference of 15 degrees or less from <101> is below 70%, or if the ratio of crystalline orientations having an orientation difference of 5 degrees or less from <101> is below 40%, reinforcement by a process for remedying the brittleness of the W material becomes insufficient, which would incur an increased likelihood of crack occurrence during the thinning process for the medium wire and so on.

Figure 3:
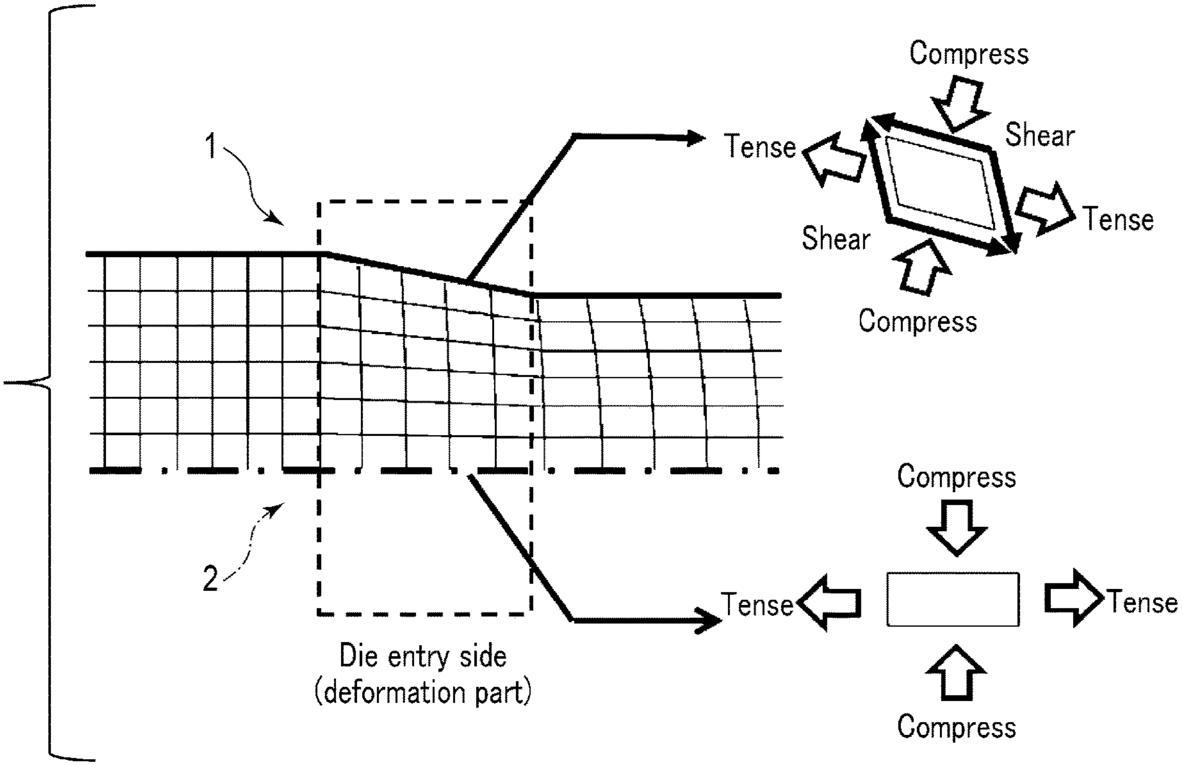
FIG. 3 gives a schematic illustration of a deformation in a die during a wire drawing process, and a stress acting on the central and surface portions.

FIG. 3 shows a deformation in a die during a wire drawing process, and a stress acting on a central portion 2 and a surface portion 1. During a wire drawing process, a ReW wire develops a plastic deformation due to an ND-direction tensile stress acting on the center, and <101> forms a dominant orientation. The outer peripheral portion 1 is deformed due to a shearing force and accordingly increases the ratio of the <227> orientation, while the dominant orientation is <101>.

In the outer peripheral portion of the ReW wire according to an embodiment, an area ratio accounted for by crystalline orientations having an orientation difference of 15 degrees or less from <101>, which is parallel to ND, to the measurement field is preferably 50% or more and 75% or less, and more preferably 60% or more and 75% or less. Also, an area ratio accounted for by crystalline orientations having an orientation difference of 15 degrees or less from <227>, which is parallel to ND, to the measurement field is preferably 30% or less. If the ratio of crystalline orientations having an orientation difference of 15 degrees or less from <101> is below 50%, or if the ratio of crystalline orientations having an orientation difference of 15 degrees or less from <227> is above 30%, there is a high probability that the ReW wire has been under a large shearing force, i.e., under abnormal wire drawing conditions (such as lubrication troubles or the like). Such situations could easily incur crack occurrence. Further, the large shearing force may have created a difference in residual stress between the inner and the outer portions, which could cause cracks. The upper limit of the ratio of crystalline orientations having an orientation difference of 15 degrees or less from <101>, which is parallel to ND, is preferably 75% or less in view of the balance with the inside of the ReW wire. If it is above 75%, there is a possibility that only the outer peripheral portion has undergone the intended processing. For the outer peripheral portion, the lower limit of the ratio of crystalline orientations having an orientation difference of 15 degrees or less from <227>, which is parallel to ND, is not particularly limited, but it is preferably 10% or more since the shearing force by the die is exerted.

A grain size is determined from a crystal grain map prepared using the EBSD analysis data. Here, one crystal grain is identified from two or more consecutive measurement points showing a difference in crystalline orientation angle of 5 degrees or less, and results are color mapped. Subsequently, for each crystal grain identified in the crystal grain map, the diameter of a circle having an equivalent area (equivalent circle diameter) is calculated and given in a histogram. The average grain size ($d_A$) is obtained by the following formula, assuming that $N_A$ represents the total number of grains, $A_i$ represents the area ratio of an individual grain, and $d_i$ represents the equivalent circle diameter.

$$d_A = \sum_{i=1}^{N_A} (A_i \times d_i) \quad \text{(Formula 1)}$$

The ReW wire according to an embodiment has an average grain size of 0.5 μm or more and 2.0 μm or less on the crystal grain map for the central portion. The maximum grain size is 2.0 μm or more and 9.0 μm or less. An average grain size of less than 0.5 μm increases the drawing force in thinning process due to the influence of grain boundary strengthening, which would easily incur crack occurrence. An average grain size of more than 2.0 μm makes reinforcement by a process for remedying the brittleness of the W material insufficient, which would incur an increased likelihood of crack occurrence during the thinning process for the medium wire and so on. A lack of strength in the size of a finished product, such as a probe pin, is also a concern. If the maximum grain size exceeds 9.0 μm, the presence of such grains causes inhomogeneity in texture and creates differences in strength and deformation capability in minute regions, which would produce uneven internal stresses and result in crack occurrence. The lower limit of the maximum grain size is not particularly limited, but it is preferably 2.0 μm or more.

The ReW wire according to an embodiment may set, on the crystal grain map for the central portion and the outer peripheral portion, a ratio of average grain sizes for its central portion and outer peripheral portion, namely, a ratio of an average grain size in the central portion to an average grain size in the outer peripheral portion (the average grain size in the central portion/the average grain size in the outer peripheral portion), to be greater than 1.0 and equal to or less than 1.3. A more preferred range of the ratio of average grain sizes is above 1.0 and below 1.3. If this ratio is equal to or greater than 1.3, there is a possibility that only the outer peripheral portion has been processed or that a large shearing force has been applied, which would incur an increased likelihood of crack occurrence during the thinning process. If the ratio is equal to or less than 1.0, there is a possibility that only the outer peripheral portion has been recrystallized by the heating in the processing steps up to the medium wire, and in this case, a difference in deformation capability is created between the inner and outer portions, which would produce uneven internal stresses and result in crack occurrence in the thinning process.

The ReW wire according to an embodiment contains Re in an amount of 1 wt % or more and 10 wt % or less. An Re content of less than 1 wt % decreases the strength, and if, for example, such a ReW wire is applied to probe pins, the obtained probe pins would involve a greater deformation as the frequency of use increases, which would cause a contact failure and consequently a deterioration in testing accuracy for semiconductors. A Re content of more than 10 wt % gives too large a deformation stress, which makes the thinning process difficult. In addition, Re is expensive, and an increase in the Re content would incur cost escalation. The Re amount refers to a value obtained from the analysis according to inductively coupled plasma optical emission spectrometry (ICP-OES).

The ReW wire according to an embodiment may contain potassium (K) as a dopant in an amount of 30 wtppm or more and 90 wtppm or less. The inclusion of K improves the tensile strength and creep strength at high temperature by a doping effect. If the K content is less than 30 wtppm, the doping effect is insufficient. If it exceeds 90 wtppm, the processability could be lowered to significantly decrease the yields. By containing K as a dopant in an amount of 30 wtppm or more and 90 wtppm or less, it is possible to, for example, manufacture thin wires for thermocouples and electronic tube heaters at high yields using the material according to the embodiment, while securing high-temperature characteristics (prevention of breakage and deformation during use at high temperature). The K amount refers to a value obtained from the analysis according to inductively coupled plasma optical emission spectrometry (ICP-OES).

Next, a method for manufacturing the ReW wire according to an embodiment will be described. While the manufacturing method is not particularly limited, methods such as the following may be adopted, for example.

A W powder and a Re powder are mixed so that the mixture has a Re content of 1 wt % or more and 10 wt % or less. Here, how to mix the powders is not particularly limited, but a method of mixing the powders in a slurry form using water or an alcohol solution is particularly preferred since this can provide a powder having a good dispersiveness. The Re powder to be mixed has, for example, an average particle size of less than 8 μm. The W powder is a pure W powder excluding inevitable impurities, or a doped W powder containing K in an amount determined in view of the yields to wire materials. The W powder has, for example, an average particle size of less than 16 μm.

Subsequently, the mixture powder is put into a predetermined mold and then press-molded. The pressure employed here is preferably 150 MPa or greater. For the sake of easier handling, the molded object may be subjected to preliminary sintering at 1200 to 1400° C. in a hydrogen furnace. The obtained molded object is sintered in a hydrogen atmosphere or an inert gas atmosphere constituted by argon, etc., or under vacuum. The sintering temperature is preferably 2500° C. or higher. If it is lower than 2500° C., Re atoms and W atoms do not diffuse well during the sintering. The upper limit of the sintering temperature is 3400° C. (or equal to or lower than the melting point of W of 3422° C.). If the upper limit of the sintering temperature exceeds the melting point of W (3422° C.), the molded object cannot maintain its shape and would turn into a defect. The relative density after the sintering is preferably 90% or more. With the sintered object having a relative density of 90% or more, it is possible to reduce the occurrence of cracking, chipping, breaking, etc., in the later swaging process (SW process).

The molding step and the sintering step may be simultaneously carried out through hot pressing in a hydrogen atmosphere or an inert gas atmosphere constituted by argon, etc., or under vacuum. The pressure is preferably 100 MPa or greater, and the heating temperature is preferably 1700° ° C. to 2825° C. This hot pressing method can provide a dense sintered object even at a relatively low temperature.

The sintered object obtained from this sintering step is subjected to a first SW process. The first SW process is preferably carried out at a heating temperature of 1300 to 1600° C. It is preferred that one heat treatment (one heating) give a ratio of reduction of the cross-sectional area (area reduction ratio) in a range of 5 to 15%. After the first SW process, a heat treatment is utilized to control crystalline orientations. The sintered object after the first SW process is yet to have its true density, and as such, strains in the sintered object tend to become non-uniform. Thus, inhomogeneity removal by a heat treatment is conducted. In one example, the heat treatment here may employ a direct electrical heating method in a hydrogen atmosphere. For the direct electrical heating, a flowing current preferably has a value of 14 to 17 $A/mm^2$. If the current value falls below 14 $A/mm^2$, fully effective strain removal for the first SW process cannot be performed. If it exceeds 17 $A/mm^2$, coarse recrystallization occurs in the outer peripheral portion of the sintered object in cross section due to non-uniform strains, which would easily cause inhomogeneity in texture. Such situations disturb control of the crystalline orientations.

After the first SW process and the heat treatment, a rolling process (RM process) is performed. The RM process is preferably carried out at a heating temperature of 1200 to 1600° C. The area reduction ratio with one heating is preferably 40 to 75%. As a rolling mill, a two-way to 4-way roller rolling mill, a die roll rolling mill, or the like may be used. With the RM process, the manufacturing efficiency can be greatly enhanced.

The sintered object (ReW rod) that has completed the RM process is subjected to a second SW process. The second SW process is preferably carried out at a heating temperature of 1200 to 1500° C. The area reduction rate with one heating is preferably 5 to 20%.

The ReW rod after the second SW process is then subjected to a recrystallization treatment. The recrystallization treatment may preferably be conducted with, for example, a high-frequency heater device at a treatment temperature in a range of 1900 to 2100° C. in a hydrogen atmosphere or an inert gas atmosphere constituted by argon, etc., or under vacuum. A treatment temperature below 1900° C. does not permit a fully effective recrystallization treatment, which would easily result in the processed texture and the recrystallized texture coexisting. A treatment temperature above 2100° C. produces coarse recrystallization, which would easily cause inhomogeneity in texture. The crystalline orientations can be controlled by conducting the recrystallization treatment at a temperature in the range of 1900 to 2100° C.

The ReW rod after the recrystallization treatment is subjected to a third SW process. The third SW process is preferably carried out at a heating temperature of 1200 to 1500° C. The area reduction rate with one heating is preferably 10 to 30%. The third SW process is continued until the ReW rod has a drawable diameter (which is preferably a diameter of 2 to 4 mm).

The ReW rod after the third SW process is subjected to a wire drawing process so that it has a diameter of 0.3 to 1.2 mm. The processing temperature is preferably 600 to 1100° C. The process-enabling temperature varies depending on wire diameter, and it becomes higher as the diameter increases. If the processing temperature is lower than the process-enabling temperature, frequent occurrence of cracks, breakage, etc. is expected. If the processing temperature is higher than the process-enabling temperature, occurrence of seizure between the ReW wire and a die is expected, or a decrease in the deformation resistance of the ReW wire, which induces occurrence of a diameter variation (thinning) after the wire drawing due to the drawing force, is expected. The area reduction ratio is preferably 15 to 35%. If it is less than 15%, a difference in constitution between the inner and the outer portions, a residual stress, etc. are created during the processing, which would cause a crack. If it is more than 35%, an excessive drawing force is used, which would greatly vary the diameter after the wire drawing process and cause a break. The drawing rate is determined according to the balance between the capacity of the heater device, the distance from the device to the die, and the area reduction ratio. The wire drawing process may additionally include, in its middle, a polishing process. The polishing process may adopt a method of, for example, conducting electrochemical polishing (electrolytic polishing) in an aqueous solution that contains sodium hydroxide at a concentration of 7 to 15 wt %. It may also be possible to add a heat treatment for mitigating strains without causing recrystallization. The wire drawing process provides a ReW wire having a diameter of 0.3 to 1.2 mm.

Note that the tungsten wire according to one or more embodiments may be used as a tungsten wire for wire drawing. Also, the tungsten wire according to one or more embodiments may be applied to a tungsten wire processing method for performing wire drawing. Moreover, the tungsten wire that has undergone the wire drawing process may be used for providing an electrolytic wire. The tungsten wire processing method, to which the tungsten wire according to one or more embodiments is applied, additionally subjects a proper amount of the ReW wire to processes such as a wire drawing process and a heat treatment as needed, so as to obtain a ReW wire having an intended diameter and required properties (strength, hardness, etc.). The resultant is subjected to electrolytic polishing to obtain an electrolytic wire.

EXAMPLES

ReW wires having compositions and diameters as set forth in Table 1 were produced according to the processing method and the processing conditions discussed above. The heat treatment after the first SW process was performed by electrical heating. The combinations of a current for the electrical heating and a temperature for the recrystallization treatment were as shown in Table 1. The lower detection limit for K was 5 wtppm, and the outcome of non-addition where the obtained analysis value was below 5 wtppm is indicated with a symbol "-". For Comparative Examples 6 and 7 which adopted a recrystallization treatment temperature of 1800° ° C., the processes were conducted in the attempt to reach a diameter of 0.3 mm; however, cracks and breakage frequently occurred during the wire drawing process, which forced termination of the production.

TABLE 1

| Sample | K amount (ppm) | Re amount (ppm) | Electrical heating current (A/mm$^2$) | Recrystallization treatment temperature (° C.) | Diameter (mm) |
|---|---|---|---|---|---|
| Ex. 1 | — | 3 | 15.5 | 2000 | 0.8 |
| Ex. 2 | 50 | 3 | 15.5 | 2000 | 0.8 |
| Ex. 3 | 60 | 3 | 15.5 | 2000 | 1.2 |
| Comp. Ex. 1 | 52 | 3 | 15.5 | 2400 | 0.8 |
| Comp. Ex. 2 | 50 | 3 | 13.0 | 2400 | 0.8 |
| Comp. Ex. 3 | 51 | 3 | 18.0 | 2400 | 0.8 |
| Ex. 4 | 58 | 10 | 15.5 | 2000 | 0.8 |
| Ex. 5 | 54 | 3 | 15.5 | 2000 | 0.3 |
| Comp. Ex. 4 | 61 | 3 | 13.0 | 2000 | 0.3 |
| Comp. Ex. 5 | 55 | 3 | 18.0 | 2000 | 0.3 |
| Comp. Ex. 6 | 51 | 3 | 13.0 | 1800 | Frequent breakage |
| Comp. Ex. 7 | 52 | 3 | 18.0 | 1800 | Frequent breakage |

Samples for measurement were taken from the ReW wire of each example, with both ends of the ReW wire cut off as discussed above, and the EBSD analysis was conducted by the method as described above so that the area ratio accounted for by the crystalline orientations and the crystal grain size were obtained. After the sampling, 1 kg was used as a material wire and subjected to the wire drawing process to the diameter of 0.15 mm. The finished ReW wire with the diameter of 0.15 mm was evaluated for a crack yield. Measurement conditions were set so as to detect cracks having a depth equal to or greater than 5% of the diameter using an eddy current flaw detector of a penetration type, while reeling in the ReW wire at a constant rate. Signals thus detected were determined to be representing cracks, and measurement was conducted in this manner. Based on the measurement results, each interval portion between the crack signals which was less than 100 g was labeled NG (no good), and an NG portion weight was obtained. Using this value, the ratio of a good portion weight (1 kg minus the NG portion weight) to 1 kg of the material wire was calculated as the yield. Table 2 shows the measurement results. As can be seen from the table, the ReW wire according to the embodiments successfully suppressed a significant number of cracks, and yields of thin wires used for electrolytic wires, probe pins, etc. can be greatly improved. Note that, in Table 2, "Central portion/outer peripheral portion" gives an average grain size ratio obtained by dividing the average grain size in the central portion by the average grain size in the outer peripheral portion.

TABLE 2

| | Central portion ND//<101> | | Outer peripheral portion | | Crystal grain | | | |
|---|---|---|---|---|---|---|---|---|
| | | | ND// <101> | ND// <227> | Central portion | | Average grain size ratio | |
| | Orientation difference ≤15° | Orientation difference ≤5° | Orientation difference ≤15° | Orientation difference ≤15° | Average grain size | Maximum grain size | Central portion/outer peripheral portion | Yield |
| Ex. 1 | 85% | 45% | 65% | 25% | 1.8 µm | 7.3 µm | 1.3 | 89% |
| Ex. 2 | 86% | 53% | 67% | 22% | 1.4 µm | 5.3 µm | 1.2 | 92% |
| Ex. 3 | 72% | 43% | 52% | 17% | 2.1 µm | 8.0 µm | 1.1 | 85% |
| Comp. Ex. 1 | 69% | 39% | 52% | 20% | 2.1 µm | 7.8 µm | 1.3 | 71% |
| Comp. Ex. 2 | 65% | 35% | 45% | 18% | 2.2 µm | 9.1 µm | 1.4 | 59% |
| Comp. Ex. 3 | 69% | 39% | 49% | 31% | 2.1 µm | 7.9 µm | 1.7 | 54% |
| Ex. 4 | 79% | 42% | 63% | 29% | 1.1 µm | 3.7 µm | 1.3 | 87% |
| Ex. 5 | 89% | 55% | 72% | 20% | 0.5 µm | 2.0 µm | 1.3 | 94% |
| Comp. Ex. 4 | 91% | 66% | 76% | 18% | 0.3 µm | 1.8 µm | 1.4 | 61% |
| Comp. Ex. 5 | 91% | 61% | 70% | 20% | 0.4 µm | 1.9 µm | 1.5 | 66% |

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

REFERENCE SIGNS LIST

S0 . . . Cross-section perpendicular to the axial direction in an embodiment: Measurement Surface ND . . . Normal Direction: Normal-to-cross-section direction (axial direction)

TD . . . Transverse Direction: Horizontal-to-cross-section direction (radial direction):

RD . . . Reference Direction: Horizontal-to-cross-section direction orthogonal to TD:

1 . . . Outer peripheral portion

2 . . . Central portion

What is claimed is:

1. A tungsten wire comprising a tungsten alloy containing rhenium, wherein, according to an electron backscattered diffraction (EBSD) analysis on a unit area, crystalline orientations having an orientation difference of 15 degrees or less from <101>, which is parallel to a wire drawing direction, account for an area ratio of 70% or more and 89% or less to a measurement field on an inverse pole figure (IPF) map, the unit area being a 40 μm×40 μm area located within a range of 100 μm concentrically extending from a central axis in a cross-section along a wire radial direction, which is perpendicular to the wire drawing direction, and wherein on a crystal grain map for a central portion of a main body of the tungsten wire, an average grain size is 0.5 μm or more and 2.0 μm or less.

2. The tungsten wire according to claim 1, wherein, on the IPF map, an area ratio accounted for by crystalline orientations having an orientation difference of 5 degrees or less from the <101>, which is parallel to the wire drawing direction, to the measurement field is 40% or more and 55% or less.

3. The tungsten wire according to claim 1, wherein, according to an EBSD analysis on a unit area, crystalline orientations having an orientation difference of 15 degrees or less from the <101>, which is parallel to the wire drawing direction, account for an area ratio of 50% or more and 75% or less to the measurement field on the IPF map, the unit area being a 40 μm×40 μm area located within a range of 50 μm extending inwardly from an outer periphery of a main body of the tungsten wire.

4. The tungsten wire according to claim 2, wherein, according to an EBSD analysis on a unit area, crystalline orientations having an orientation difference of 15 degrees or less from the <101>, which is parallel to the wire drawing direction, account for an area ratio of 50% or more and 75% or less to the measurement field on the IPF map, the unit area being a 40 μm×40 μm area located within a range of 50 μm extending inwardly from an outer periphery of a main body of the tungsten wire.

5. The tungsten wire according to claim 1, wherein, on the IPF map for an outer peripheral portion of a main body of the tungsten wire, an area ratio accounted for by crystalline orientations having an orientation difference of 15 degrees or less from <227>, which is parallel to the wire drawing direction, to the measurement field is 10% or more and 30% or less.

6. The tungsten wire according to claim 1, wherein, on a crystal grain map for a central portion of a main body of the tungsten wire, a maximum grain size is 2.0 μm or more and 9.0 μm or less.

7. The tungsten wire according to claim 1, wherein, on a crystal grain map for a central portion and an outer peripheral portion of a main body of the tungsten wire, a ratio of a grain size in the central portion to a grain size in the outer peripheral portion is greater than 1.0 and equal to or less than 1.3.

8. The tungsten wire according to claim 1, wherein the tungsten alloy contains rhenium in an amount of 1 wt % or more and 10 wt % or less.

9. The tungsten wire according to claim 1, wherein the tungsten alloy contains potassium (K) in an amount of 30 wtppm or more and 90 wtppm or less.

10. The tungsten wire according to claim 1, having a diameter of 0.3 mm or more and 1.2 mm or less.

11. The tungsten wire according to claim 1 for wire drawing.

12. A tungsten wire processing method comprising drawing the tungsten wire according to claim 1.

13. An electrolytic wire comprising the tungsten wire drawn by the tungsten wire processing method according to claim 12.

* * * * *